(12) United States Patent
Widdrington et al.

(10) Patent No.: US 11,633,998 B2
(45) Date of Patent: Apr. 25, 2023

(54) SUSPENSION STRUT

(71) Applicant: BAE SYSTEMS plc, London (GB)

(72) Inventors: Liam Bradley Widdrington, Barrow-in-Furness (GB); Andrew James Kittley, Barrow-in-Furness (GB); Philip Alner Wilby, Barrow-in-Furness (GB)

(73) Assignee: BAE SYSTEMS PLC, London (GB)

( * ) Notice: Subject to any disclaimer, the term of this patent is extended or adjusted under 35 U.S.C. 154(b) by 405 days.

(21) Appl. No.: 16/764,044

(22) PCT Filed: Nov. 12, 2018

(86) PCT No.: PCT/GB2018/053257
§ 371 (c)(1),
(2) Date: May 14, 2020

(87) PCT Pub. No.: WO2019/097210
PCT Pub. Date: May 23, 2019

(65) Prior Publication Data
US 2020/0391564 A1 Dec. 17, 2020

(30) Foreign Application Priority Data
Nov. 16, 2017 (GB) ...................... 1718949

(51) Int. Cl.
*B60G 11/26* (2006.01)
*F16F 9/06* (2006.01)

(52) U.S. Cl.
CPC .............. *B60G 11/26* (2013.01); *F16F 9/063* (2013.01); *F16F 9/064* (2013.01);
(Continued)

(58) Field of Classification Search
CPC ....... B60G 11/26; B60G 11/265; B60G 11/27; B60G 2202/24; B60G 2202/242;
(Continued)

(56) References Cited

U.S. PATENT DOCUMENTS 2,819,064 A 1/1958 Peras
4,381,857 A * 5/1983 Cook ...................... F16F 9/063
244/104 FP (Continued)

FOREIGN PATENT DOCUMENTS

DE 1915102 A1 10/1970
DE 3935608 A1 5/1991
(Continued)

OTHER PUBLICATIONS

International Preliminary Report on Patentability received for PCT Application No. PCT/GB2018/053257. dated May 19, 2020. 7 pages.

(Continued)

*Primary Examiner* — Karen Beck
*Assistant Examiner* — Scott F. Underwood
(74) *Attorney, Agent, or Firm* — Finch & Maloney PLLC (57) ABSTRACT

A suspension strut for a vehicle comprises: a first connector for connecting to a first point on the vehicle; a second connector for connecting to a second point on the vehicle; and a damper assembly adapted to provide a damping force as fluid flows through the damper assembly during relative compression between the first point and the second point, wherein the damper assembly comprises a side wall and a damper aperture in the side wall, wherein the damper aperture is open throughout operation of the strut to allow fluid to flow through the damper assembly.

20 Claims, 6 Drawing Sheets

(52) U.S. Cl.
CPC .......... *B60G 2202/24* (2013.01); *F16F 9/067* (2013.01); *F16F 2230/20* (2013.01)

(58) Field of Classification Search
CPC ...... B60G 2202/32; F16F 9/061; F16F 9/063; F16F 9/064; F16F 9/067; F16F 9/068; F16F 2230/20
See application file for complete search history.

(56) References Cited

U.S. PATENT DOCUMENTS

| | | | | |
|---|---|---|---|---|
| 5,180,186 A | * | 1/1993 | Charles | F16F 9/36 188/282.1 |
| 2002/0108826 A1 | * | 8/2002 | Miller | F16F 9/466 188/280 |
| 2002/0149140 A1 | * | 10/2002 | Kitaura | F16F 9/06 267/130 |
| 2003/0136622 A1 | | 7/2003 | Coombs et al. | |
| 2006/0266602 A1 | * | 11/2006 | Robertson | F16F 9/063 188/322.15 |
| 2008/0078635 A1 | * | 4/2008 | Oblizajek | F16F 9/48 188/282.4 |
| 2013/0341842 A1 | * | 12/2013 | Weber | F16F 9/061 267/127 |
| 2014/0203530 A1 | * | 7/2014 | Coombs | B60G 17/08 188/266.2 |
| 2015/0000748 A1 | * | 1/2015 | Shelcoviz | F16K 37/0075 137/511 |
| 2016/0214453 A1 | * | 7/2016 | Tanahashi | F16F 9/46 |
| 2016/0243917 A1 | * | 8/2016 | Ankney | F16F 9/516 |
| 2017/0254380 A1 | * | 9/2017 | Ankney | F16F 9/3481 |
| 2019/0178329 A1 | * | 6/2019 | Dumitru | F16F 9/16 |
| 2019/0293146 A1 | * | 9/2019 | Patel | F16F 9/185 |
| 2020/0223276 A1 | * | 7/2020 | Rositch | F16F 9/56 |
| 2020/0398632 A1 | * | 12/2020 | Newstead | F16F 9/43 |

FOREIGN PATENT DOCUMENTS

| | | |
|---|---|---|
| GB | 942804 A | 11/1963 |
| GB | 2272267 A | 11/1994 |
| WO | 2006010207 A1 | 2/2006 |
| WO | 2015013917 A1 | 2/2015 |
| WO | 2019097210 A1 | 5/2019 |

OTHER PUBLICATIONS

International Search Report and Written Opinion received for PCT Application No. PCT/GB2018/053257. dated Feb. 25, 2019 14 pages.
GB Search Report under Section 17(5) received for GB Application No. 1718949.9, dated Apr. 20, 2018. 3 pages.

* cited by examiner

SUSPENSION STRUT

The invention relates to a suspension strut and a vehicle.

Suspension struts for vehicle often include a damper device to provide a damping force to resist compression of the suspension strut. However, it is desirable to avoid such damping force during extension of the suspension strut, where a faster reaction time is desirable.

According to a first aspect of the invention, there is provided a suspension strut for a vehicle, the suspension strut comprising: a first connector for connecting to a first point on the vehicle; a second connector for connecting to a second point on the vehicle; and a damper assembly adapted to provide a damping force as fluid flows through the damper assembly during relative compression between the first point and the second point, wherein the damper assembly comprises a side wall and a damper aperture in the side wall, wherein the damper aperture is open throughout operation of the strut to allow fluid to flow through the damper assembly.

Including such a damper aperture is advantageous, as it allows damping to be reduced during relative extension between the first point and the second point, resulting in a faster extension reaction. The reduction in damping is less significant during relative compression, as relative compression occurs much more quickly than relative extension.

In one example, the damper assembly comprises a damper valve openable by fluid flowing through the damper assembly during relative compression between the first point and the second point, the damper valve remaining closed as fluid flows through the damper assembly during relative extension between the first point and the second point. In one example, the damper valve comprises: a plate; a valve aperture; and a bias device, wherein the bias device biases the plate towards the valve aperture to close the valve aperture, and fluid flowing through the damper assembly during relative compression between the first point and the second point causes the plate to move away from the valve aperture to open the damper valve. The damper valve is particularly advantageous in combination with the damper aperture, as the aperture being in a side wall means that the full axial area of the damper assembly can be devoted to the damper valve. This increases the surface area of the damper valve, which allows the valve to open more easily with only a small differential pressure across the damper valve.

In one example, the suspension strut further comprises second and third damper apertures in the side wall of the damper assembly, wherein the second and third damper apertures are open throughout operation of the strut to allow fluid to flow through the damper assembly.

In one example, the suspension strut further comprises a rod connected to the first point; a cylinder connected to the second point, the cylinder movable with respect to the rod to effect displacement of the first point relative to the second point; wherein the damper assembly is located within an end region of the rod, the damper assembly providing a damping force as fluid flows into the rod through the damper assembly during relative compression between the first point and the second point.

In one example, the suspension strut further comprises a piston; and a first chamber on a first side of the piston, wherein displacement of the first point relative to the second point is resisted by a change in volume of the first chamber due to movement of the piston.

In one example, the piston comprises a first cavity on the first side of the piston, the first cavity forming part of the first chamber. Including the first cavity is advantageous, as it increases an effective volume of the first chamber. This means that if the pressure in the first chamber falls, the effect on the performance of the strut, and the likelihood of bottom out of the piston is reduced.

Additionally, increasing the effective volume means that during relative compression between the first point and the second point, the pressure rise in the first chamber is reduced. This means that the maximum operating pressure of the strut is reduced, decreasing the stresses in the strut. This also means that the pre-charge pressure of the piston (i.e. the pressure in the first chamber before the vehicle is raised up to its operating height) can be increased without a corresponding increase in maximum operating pressure, allowing a heavier load to be carried by the vehicle.

In one example, the piston is a floating piston, and the suspension strut comprises a second chamber on a second side of the piston. In one example, the piston comprises a second cavity on the second side of the piston, the second cavity forming part of the second chamber. The second cavity is advantageous, as the damping assembly can locate within the second cavity during extension of the strut.

In one example, the first chamber and the piston are located within the rod, and the second chamber is located at least partially within the second cylinder, the piston movable within the rod to effect movement of the rod relative to the cylinder and displacement of the first point relative to the second point.

In one example, the first chamber comprises a first port allowing a first fluid to enter the first chamber during a pre-charging phase, the first port operable to be closed in use.

In one example, the second chamber comprises a second port allowing second fluid to flow into the second chamber during a vehicle preparation phase, the second port operable to be closed in use.

In one example, the first fluid is a gas and the second fluid is a liquid, such that the second chamber is operable to maintain a substantially constant volume in use.

According to a second aspect of the invention, there is provided a vehicle comprising a suspension strut as described above.

In one example, the vehicle is a military vehicle for carrying a weapon.

For a better understanding of the invention reference is made, by way of example only, to the accompanying figures, in which.

Figure 1:
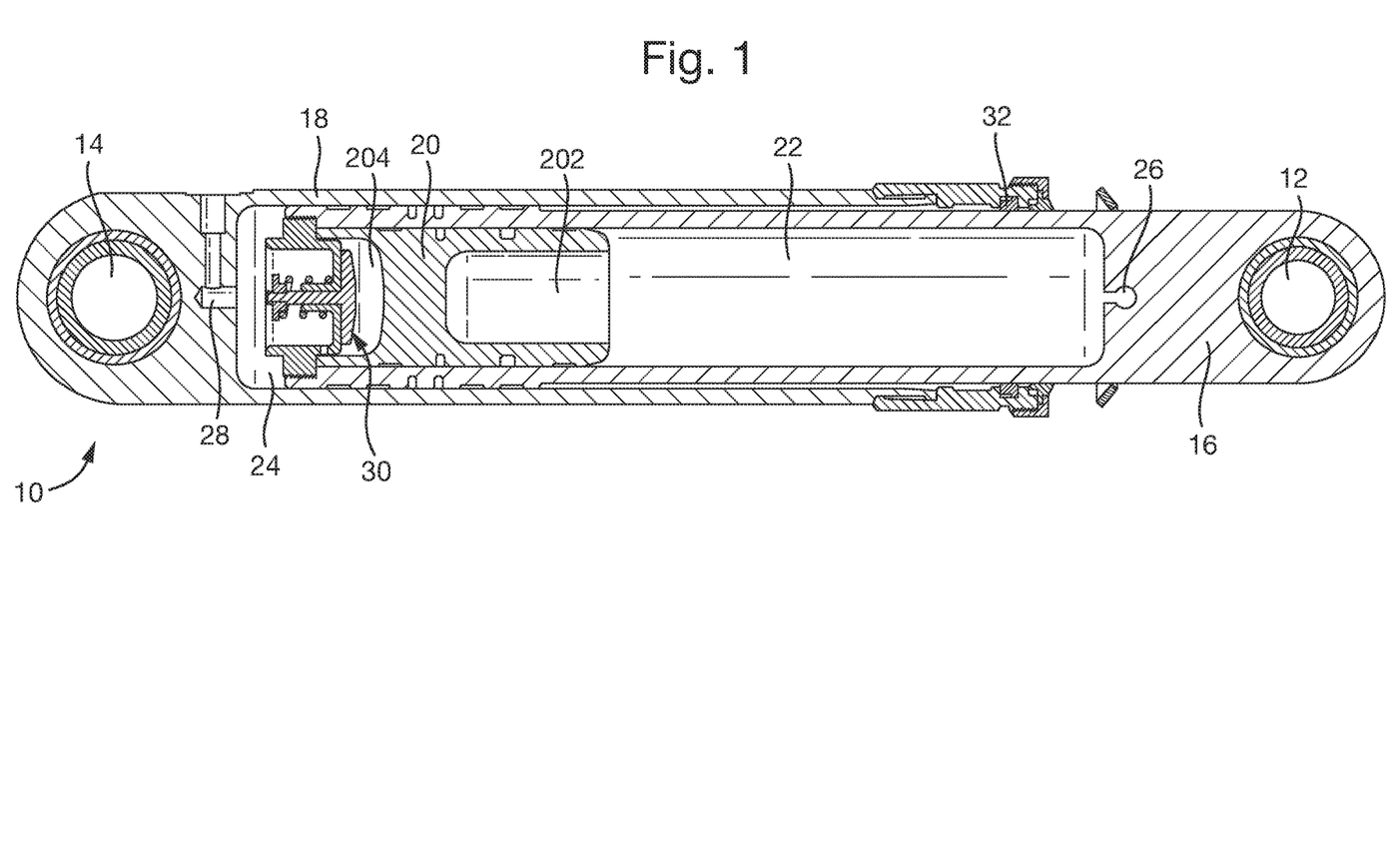
FIG. 1 shows a sectional view of a suspension strut.

Referring to FIG. 1 there is shown a sectional view of a suspension strut 10. The suspension strut 10 comprises a first connector 12 for connecting to a first point on a vehicle (not shown) and a second connector 14 for connecting to second point on the vehicle. The first connector 12 and the second connector 14 are located at opposite end regions of the suspension strut 10.

The suspension strut 10 comprises a rod 16 connected to the first connector 12. The rod 16 is integrally formed with the first connector 12. The suspension strut 10 comprises a cylinder 18 connected to the second connector 18. The cylinder 18 is integrally formed with the second connector 14. The rod 16 and the cylinder 18 are coaxial, with the rod 16 located within and slidable relative to the cylinder 18. The rod 16 and the cylinder 18 are elongate. The rod 16 and the cylinder 18 are hollow. The rod 16 and the cylinder 18 are constructed from titanium.

The suspension strut 10 comprises a piston 20 (described in more detail below with respect to FIG. 2 and FIG. 3). The piston 20 is a floating piston. The piston 20 is located within and movable relative to the rod 16. The piston 20 seals the rod 16, thereby providing a boundary between a first chamber 22 and a second chamber 24.

The first chamber 22 is located entirely within the rod 16. The second chamber 24 is located at least partially within the cylinder 18. The second chamber 24 is located partially within the rod 16. The volume of second chamber 24 located in the rod 16 and the cylinder 18 varies throughout operation of the suspension strut 10, as described below with respect to FIG. 6 to FIG. 9.

The suspension strut 10 comprises a first port 26 in fluid communication with the first chamber 22. The first port 26 is closable by a charging valve (not shown), which closes to form a seal after pre-charging. The suspension strut comprises a second port 28 in fluid communication with the second chamber 24. The second port 28 is closable by a valve (not shown).

The suspension strut 10 comprises a seal 32, which provides a seal between the rod 16 and the cylinder 18. The seal 32 is fixed to the cylinder 18, and surrounds the rod 16, to prevent fluid from flowing out of the suspension strut 10 from the cylinder 18. The seal 32 remains in place on the cylinder 18 as during sliding of the rod 16 relative to the cylinder 18. The seal 32 is an excluder. In addition to the seal 32, further seals (not shown) are included on the rod 16 and/or cylinder 18.

The suspension strut 10 comprises a damper assembly 30 (described in more detail below with respect to FIG. 4 and FIG. 5). The damper assembly 30 is located inside the rod 16 in an end region of the rod 16. The damper assembly 30 is fixed in position in the rod 16. The damper assembly fully spans the rod's diameter.

Figure 2:
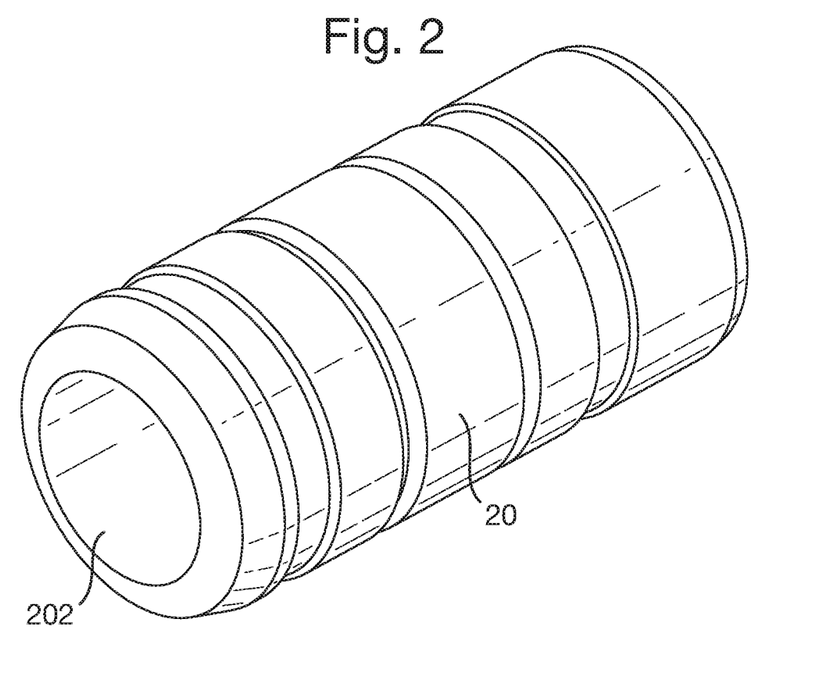
FIG. 2 shows a perspective view of a piston.
Figure 3:
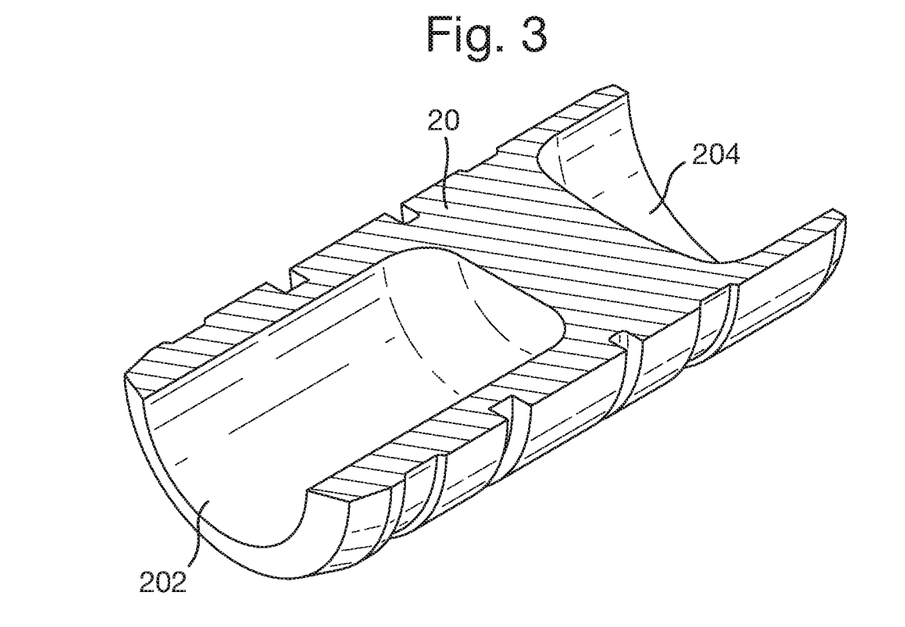
FIG. 3 shows a cut away perspective view of the piston.

Referring to FIG. 2 and FIG. 3, there are shown views of the piston 20. The piston 20 comprises a first cavity 202 on a first side of the piston 20. The piston 20 comprises a second cavity 204 on a second side of the piston 20.

As shown in FIG. 1, the first cavity 202 is in fluid communication with and forms part of the first chamber 22. The presence of the first cavity 202 provides an increase in an effective volume of the first chamber 22. Similarly, the second cavity 204 is in fluid communication with and forms part of the second chamber 24. The presence of the second cavity 204 provides an increase in an effective volume of the second chamber 24.

The piston 20 comprises rounded edges on the first side and the second side of the piston 20. This prevents damage to the rod 16 and the damper assembly 30, as explained in more detail below with respect to FIGS. 6 to 9. The first cavity 202 is sized to provide a desired spring curve for the piston 20.

Figure 4:
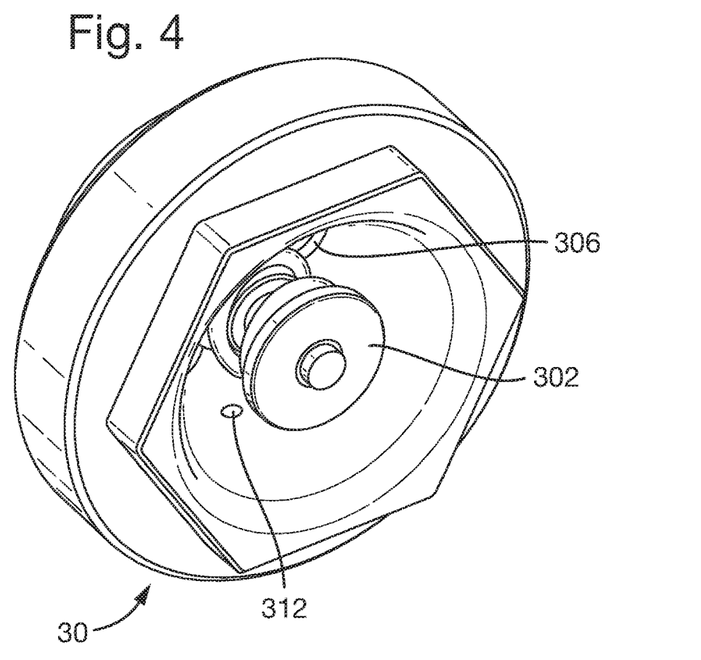
FIG. 4 shows a perspective view of a damper assembly.
Figure 5:
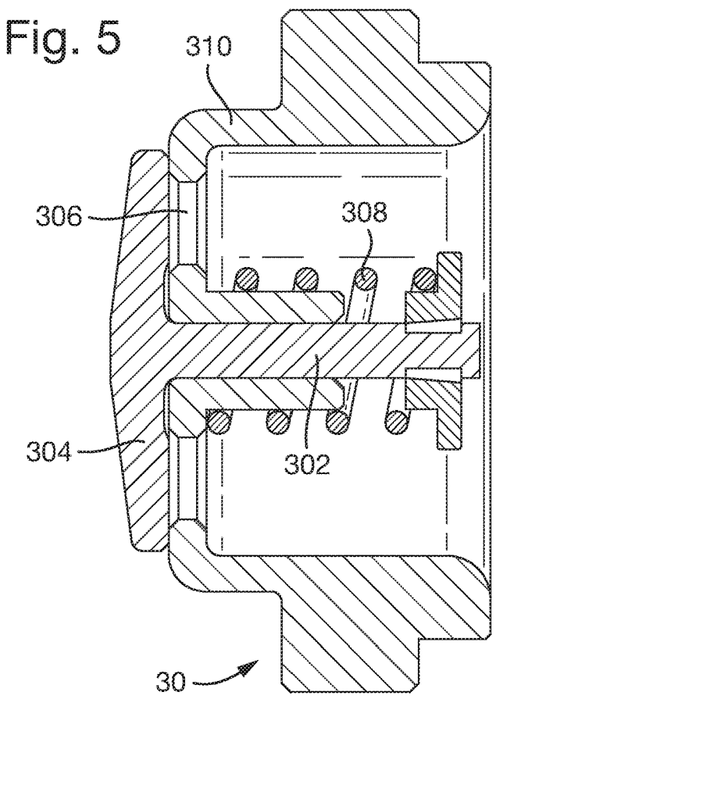
FIG. 5 shows a sectional view of the damper assembly.

Referring to FIG. 4 and FIG. 5, there are shown views of the damper assembly 30. The damper assembly 30 comprises a damper valve 302. The damper valve 302 comprises a plate 304, a valve aperture 306 and a bias device 308 (i.e. a spring). The damper valve 302 comprises six valve apertures 306, each of which has a diameter of 9 mm.

The damper assembly 30 has a top hat construction, such that the damper assembly 30 comprises a side wall 310. The side wall 310 extends along the strut in a substantially axial direction. Additionally, the side wall 310 extends fully around a circumference of the damper assembly.

The plate 304 is located on an axial face of the damper assembly 30. The plate 304 extends across a major portion of the diameter of the rod 16. The valve aperture 306 is also located on the axial face of the damper assembly 30. The bias device 308 biases the plate 304 towards the valve aperture 306, so that the plate 304 closes the valve aperture 306.

Figure 4A:
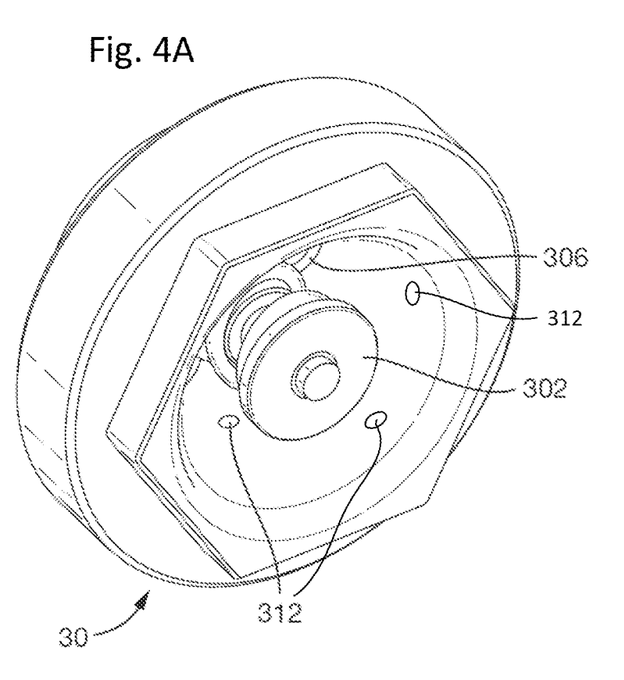
FIG. 4A shows the perspective view of the damper assembly of FIG. 4, along with a plurality of damper apertures.

The damper assembly 30 comprises three damper apertures 312 (only one example of which is shown in FIG. 4, and three examples of which are shown in FIG. 4A). The damper apertures 312 are located in the side wall 310. The damper apertures 312 extend through the side wall 310 in a substantially radial direction. The damper 35 apertures 312 provide fluid communication between two sides of the damper assembly 30. This means that fluid can flow through the damper apertures 312 between the rod 16 and the cylinder 18.

The operation of the suspension strut 10 is now explained with reference to FIG. 6 to FIG. 9. For clarity, many of the reference numerals are omitted from FIG. 6 to FIG. 9. However, it will be appreciated that the suspension strut 10 of FIG. 6 to FIG. 9 is the same suspension strut 10 as that shown in FIG. 1.

Figure 6:
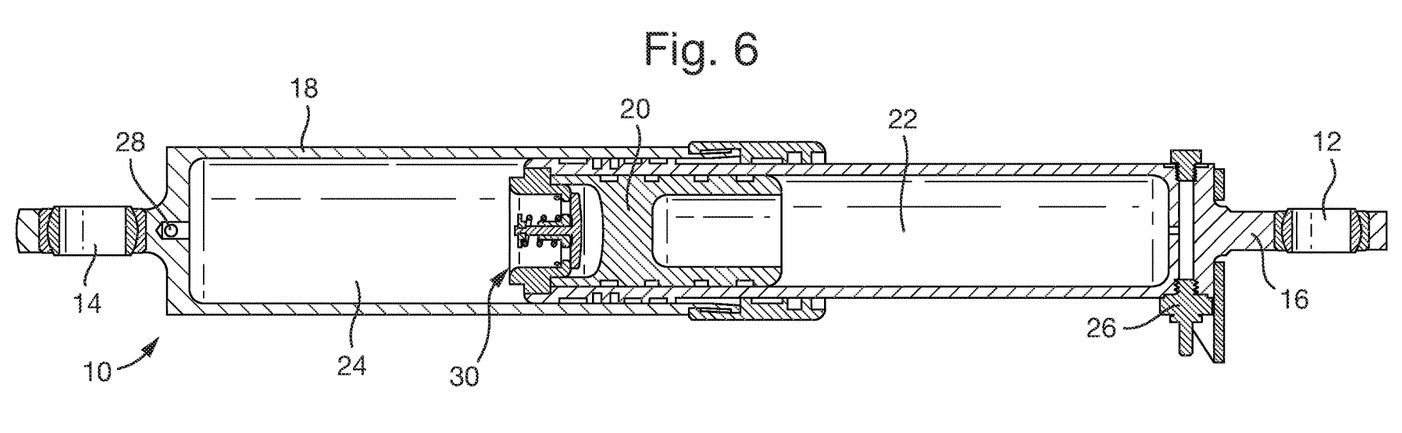
FIG. 6 shows a first sectional view of the suspension strut during operation.

Referring to FIG. 6, there is shown a sectional view of the suspension strut 10 in a pre-charge phase. During the pre-charge phase, the first connector 12 is fixed relative to the second connector 14. A compressor is used to pass first fluid (which is a gas) into the first chamber 22 through the first port 26. This causes the piston 20 to slide along the rod 16, until the piston 20 reaches the damper assembly 30 and cannot move any further. Further first fluid is added until a desired pre-charge pressure is reached in the first chamber 22. The first port 26 is then closed, and remains closed during use. The first fluid is nitrogen.

Figure 7:
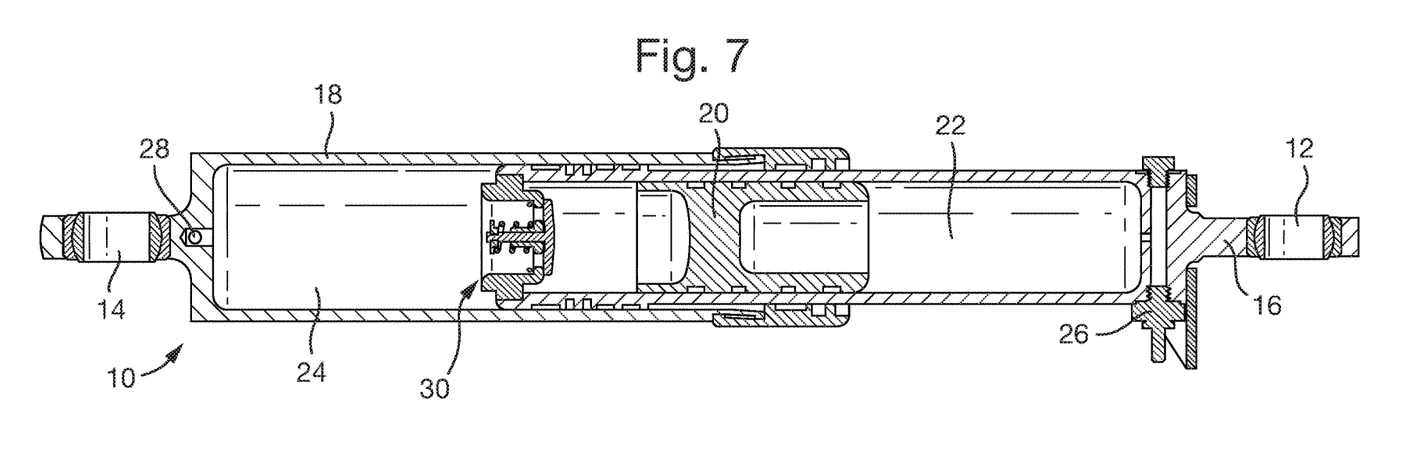
FIG. 7 shows a second sectional view of the suspension strut during operation.

Referring to FIG. 7, there is shown a sectional view of the suspension strut 10 in a static nominal ride height position on a vehicle. Following the pre-charge phase, the first connector 12 is fixed to the first point on the vehicle, and the second connector 14 is fixed to the second point on the vehicle. The first point is connected to a wheel of the vehicle, while the second point is connected to a body of the vehicle.

To reach the static nominal ride height position, second fluid (which is liquid) is pumped into the second chamber 24 through the second port 28, until the desired height of the vehicle is reached. During this process, the piston 20 moves within the rod 16, reducing the volume of the first chamber 22 and compressing the first fluid. This causes compression of the suspension strut, with displacement of the first point relative to the second point decreasing. Once the desired ride height is reached, the second port 28 is closed, and remains closed during use. The second fluid is an oil.

Figure 8:
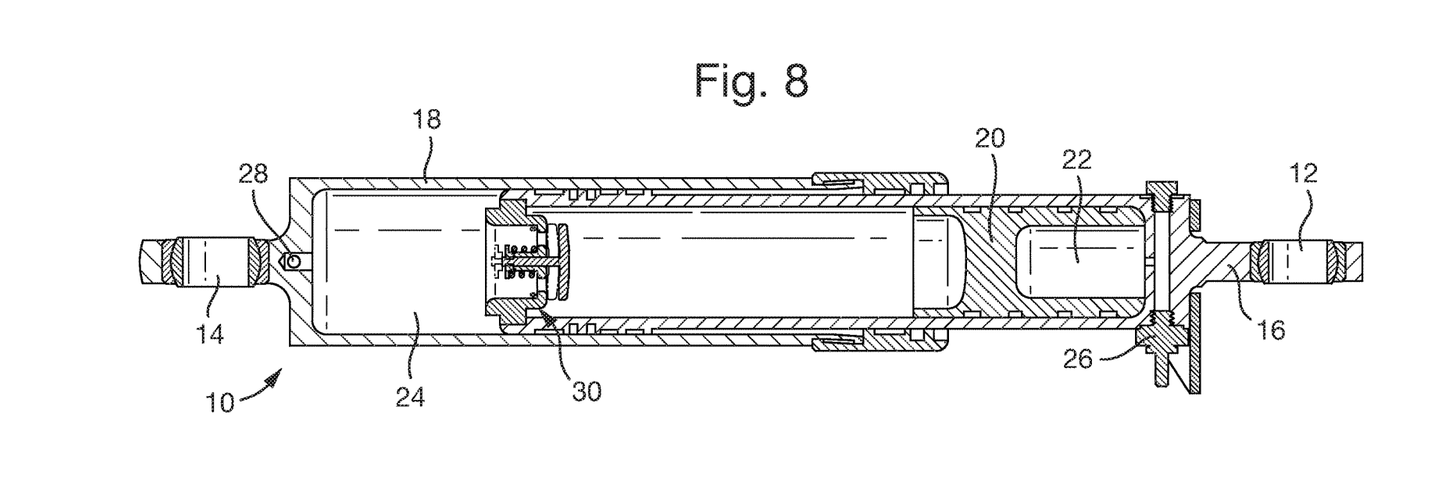
FIG. 8 shows a third sectional view of the suspension strut during operation.

Referring to FIG. 8, there is shown a sectional view of the suspension strut 10 in a piston bottom out position. When the wheel travels over a bump, the suspension strut 10 compresses, and the displacement of the first point relative to the second point decreases, which causes the piston 20 to move within the rod 16 to decrease the volume of the first chamber 22. Compressed first fluid in the first chamber resists compression of the suspension strut 10.

During compression of the suspension strut 10, the volume of the second chamber 24 (which contains the second fluid, a liquid) remains approximately constant. Second fluid flows from the cylinder 18 into the rod 16, which causes the plate 304 to displace away from the valve aperture 306, overcoming the bias device. The second fluid then flows through the valve apertures 306, which provides a damping force to oppose the compression and the movement of the first point towards the second point.

At the position show in FIG. 8, the suspension strut has undergone significant compression (for example, due to the wheel travelling over a large bump) such that the piston 20 has reached a bottom out position, in which the piston 20 is in contact with the end of the rod. In this position, the entirety of the first chamber 22 is located within the first cavity 202 of the piston 20. This demonstrates an advantage of the first cavity 202, which is that when the piston 20 bottoms out, some volume remains available for first fluid, which means that the maximum operating pressure in the suspension strut 10 is much lower than in a strut without such a first cavity 202. Additionally, the rounded edge on the first side of the piston 20 helps avoid damage to the rod 16.

Figure 9:
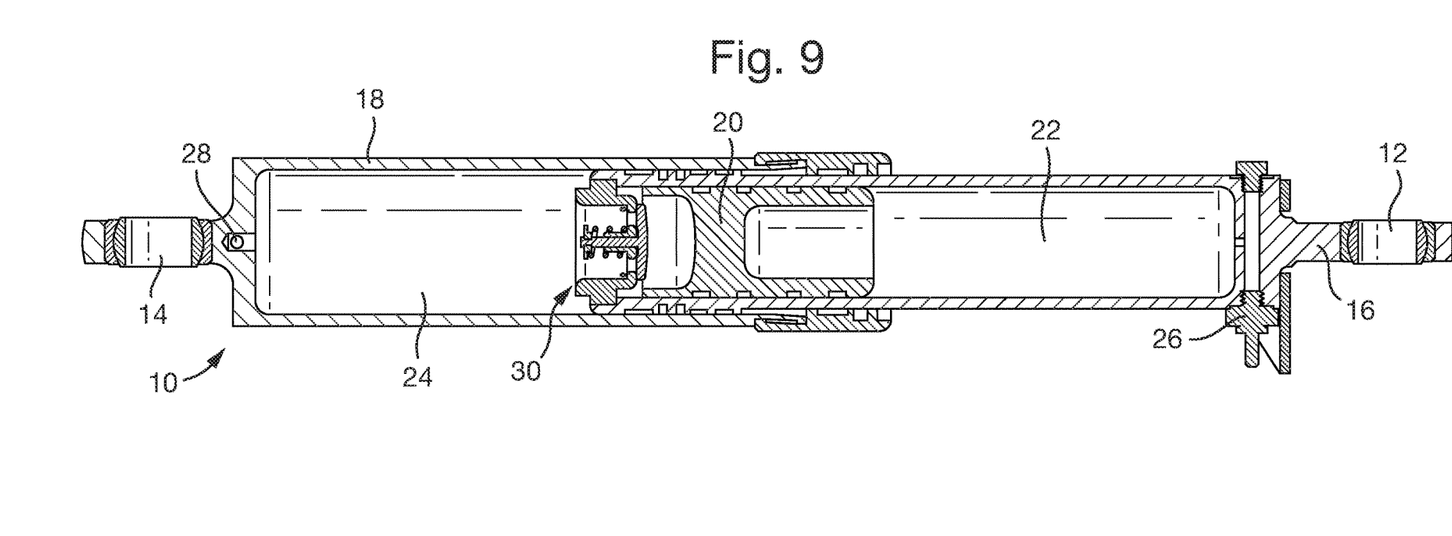
FIG. 9 shows a fourth sectional view of the suspension strut during operation.

Referring to FIG. 9, there is shown a sectional view of the suspension strut 10 in a fully extended position. Such extension may occur during rebound from the wheel travelling over a bump when the vehicle is off the ground.

During extension of the suspension strut 10, the displacement of the first point relative to the second point increases, which causes the piston 20 to move within the rod 16 to increase the volume of the first chamber 22. The pressure in the first chamber 22 falls as the first fluid expands while the vehicle is off the ground, which resists the extension.

During extension of the suspension strut 10, the volume of the second chamber 24 (which contains the second fluid, a liquid) remains approximately constant. Second fluid flows from the rod 16 into the cylinder 18. However, since the second fluid flows in the same direction as that in which the bias device's 308 bias acts, the plate 304 remains against the valve aperture 306, which causes the valve aperture 306 to remain closed. However, second fluid flows through the damper apertures 310.

At the position show in FIG. 9, the suspension strut has undergone significant extension (for example, due to rebound after the wheel travels over a large bump) such that the piston 20 has reached a fully extend position, in which the piston 20 is almost in contact with damper assembly 30. In this position, the damper assembly 30 is located within the second cavity 204, preventing impact between the damper assembly 30 and the piston 20.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A suspension strut for a vehicle, the suspension strut comprising:
   a first connector for connecting to a first point on the vehicle;
   a second connector for connecting to a second point on the vehicle;
   a damper assembly adapted to provide a damping force as fluid flows through the damper assembly during relative compression between the first point and the second point, wherein the damper assembly comprises
      a side wall and a damper aperture in the side wall, wherein the damper aperture is open throughout operation of the strut to allow fluid to flow through the damper assembly, and a damper valve openable by fluid flowing through the damper assembly during relative compression between the first point and the second point, the damper valve remaining closed as fluid flows through the damper assembly during relative extension between the first point and the second point, wherein the damper valve comprises
         a valve aperture provided in an axial face of the of the damper assembly,
         a plate configured to be located on the same axial face of the damper assembly, and
         a bias device, wherein the bias device biases the plate towards the valve aperture and axial face to close the valve aperture, and fluid flowing through the damper assembly during relative compression between the first point and the second point causes the plate to move away from the valve aperture and axial face to open the damper valve, wherein the plate and the bias device are on opposing sides of the valve aperture;
   a piston; and
   a first chamber on a first side of the piston, and a second chamber on a second side of the piston, wherein the piston comprises a cavity on the second side of the piston, the cavity forming part of the second chamber;
   wherein displacement of the first point relative to the second point is resisted by a change in volume of the first chamber due to movement of the piston.

2. The suspension strut according to claim 1, wherein the damper aperture is a first damper aperture, the damper assembly further comprising second and third damper apertures in the side wall of the damper assembly, wherein the second and third damper apertures are open throughout operation of the strut to allow fluid to flow through the damper assembly.

3. The suspension strut according to claim 1, further comprising:
a rod connectable to the first point via the first connector; and
a cylinder connectable to the second point via the second connector, the cylinder movable with respect to the rod to effect displacement of the first point relative to the second point;
wherein the damper assembly is located within an end region of the rod, the damper assembly providing a damping force as fluid flows into the rod through the damper assembly during relative compression between the first point and the second point.

4. The suspension strut according to claim 3, wherein the first chamber and the piston are located within the rod, and the second chamber is located at least partially within the cylinder, the piston movable within the rod to effect movement of the rod relative to the cylinder and displacement of the first point relative to the second point.

5. The suspension strut according to claim 1, wherein the cavity is a second cavity, and the piston further comprises a first cavity on the first side of the piston, the first cavity forming part of the first chamber.

6. The suspension strut according to claim 1, wherein the first chamber comprises a first port allowing a first fluid to enter the first chamber during a pre-charging phase, the first port operable to be closed in use.

7. The suspension strut according to claim 6, wherein the second chamber comprises a second port allowing a second fluid to flow into the second chamber during a vehicle preparation phase, the second port operable to be closed in use.

8. The suspension strut according to claim 7, wherein the first fluid is a gas and the second fluid is a liquid, such that the second chamber is operable to maintain a substantially constant volume in use.

9. A vehicle comprising the suspension strut according to claim 1.

10. The vehicle according to claim 9, wherein the vehicle is a military vehicle for carrying a weapon.

11. A damper assembly adapted to provide a damping force as fluid flows through the damper assembly during relative compression between a first point and a second point, the damper assembly comprising:
a side wall and a damper aperture in the side wall, wherein the damper aperture is openable to allow fluid to flow through the damper assembly; and
a damper valve openable by fluid flowing through the damper assembly during relative compression between the first point and the second point, the damper valve remaining closed as fluid flows through the damper assembly during relative extension between the first point and the second point, wherein the damper valve comprises
a valve aperture provided in an axial face of the of the damper assembly,
a plate configured to be located on the same axial face of the damper assembly and located on a first side of the valve aperture, and
a bias device located on a second side of the valve aperture that is opposite the first side, wherein the bias device biases the plate towards the valve aperture and axial face to close the valve aperture, and fluid flowing through the damper assembly during relative compression between the first point and the second point causes the plate to move away from the valve aperture and axial face to open the damper valve.

12. The damper assembly according to claim 11, wherein the damper aperture is a first damper aperture, the damper assembly further comprising second and third damper apertures in the side wall of the damper assembly, wherein the second and third damper apertures are openable to allow fluid to flow through the damper assembly.

13. A suspension strut comprising the damper assembly according to claim 11, wherein the damper aperture is open throughout operation of the strut to allow fluid to flow through the damper assembly, the suspension strut comprising:
a piston; and
a first chamber on a first side of the piston, and a second chamber on a second side of the piston, wherein the piston comprises a first cavity on the first side of the piston, the first cavity forming part of the first chamber, and wherein the piston comprises a second cavity on the second side of the piston, the second cavity forming part of the second chamber;
wherein displacement of the first point relative to the second point is resisted by a change in volume of the first chamber due to movement of the piston.

14. The suspension strut according to claim 13, further comprising:
a rod connectable to the first point; and
a cylinder connectable to the second point, the cylinder movable with respect to the rod to effect displacement of the first point relative to the second point;
wherein the damper assembly is located within an end region of the rod, the damper assembly providing a damping force as fluid flows into the rod through the damper assembly during relative compression between the first point and the second point.

15. The suspension strut according to claim 14, wherein the first chamber and the piston are located within the rod, and the second chamber is located at least partially within the cylinder, the piston movable within the rod to effect movement of the rod relative to the cylinder and displacement of the first point relative to the second point.

16. The suspension strut according to claim 13, wherein the first chamber comprises a first port allowing a first fluid to enter the first chamber during a pre-charging phase, the first port operable to be closed in use, and wherein the second chamber comprises a second port allowing a second fluid to flow into the second chamber during a vehicle preparation phase, the second port operable to be closed in use.

17. The suspension strut according to claim 16, wherein the first fluid is a gas and the second fluid is a liquid, such that the second chamber is operable to maintain a substantially constant volume in use.

18. A vehicle comprising the suspension strut according to claim 13.

19. A suspension strut for a vehicle, the suspension strut comprising:
a first connector for connecting to a first point on the vehicle;
a second connector for connecting to a second point on the vehicle;
a rod connectable to the first point via the first connector;
a cylinder connectable to the second point via the second connector, the cylinder movable with respect to the rod to effect displacement of the first point relative to the second point;

a damper assembly located within a region of the rod, the damper assembly providing a damping force as fluid flows into the rod through the damper assembly during relative compression between the first point and the second point, the damper assembly including
   a side wall and a damper aperture in the side wall, wherein the damper aperture allows fluid to flow through the damper assembly during operation of the strut, and
   a damper valve openable by fluid flowing through the damper assembly during relative compression between the first point and the second point, the damper valve remaining closed as fluid flows through the damper assembly during relative extension between the first point and the second point, wherein the damper valve includes
   a valve aperture,
   a plate, and
   a bias device to bias the plate towards the valve aperture to close the valve aperture, and fluid flowing through the damper assembly during relative compression between the first point and the second point causes the plate to move away from the valve aperture to open the damper valve, wherein the plate and the bias device are on opposing sides of the valve aperture;
a piston; and
a first chamber on a first side of the piston, and a second chamber on a second side of the piston, wherein displacement of the first point relative to the second point is resisted by a change in volume of the first chamber due to movement of the piston.

20. A vehicle comprising the suspension strut according to claim 19.

* * * * *